Dec. 23, 1924.  
R. L. MORLAN ET AL  
1,520,257  
COMBINATION LICENSE PLATE AND TAIL LIGHT STRUCTURE  
Filed Feb. 27, 1924
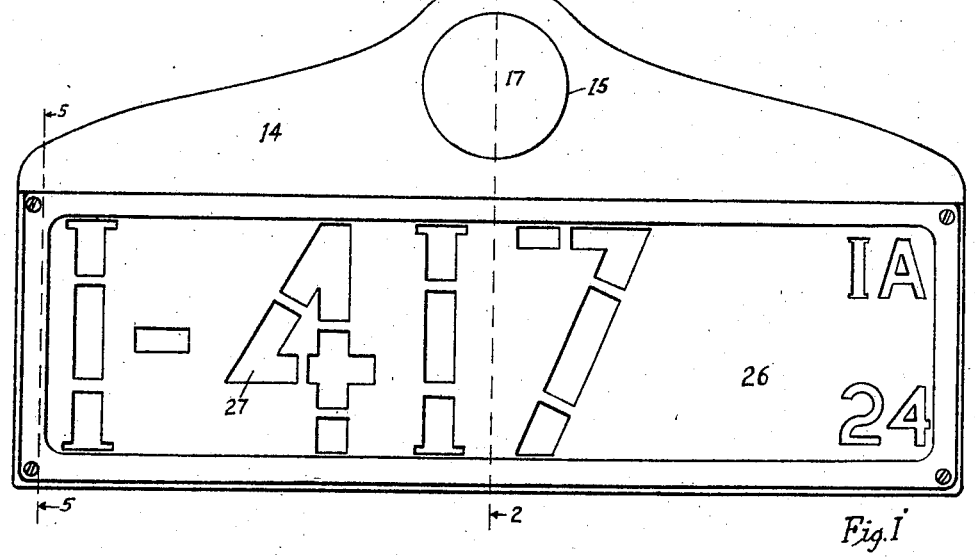
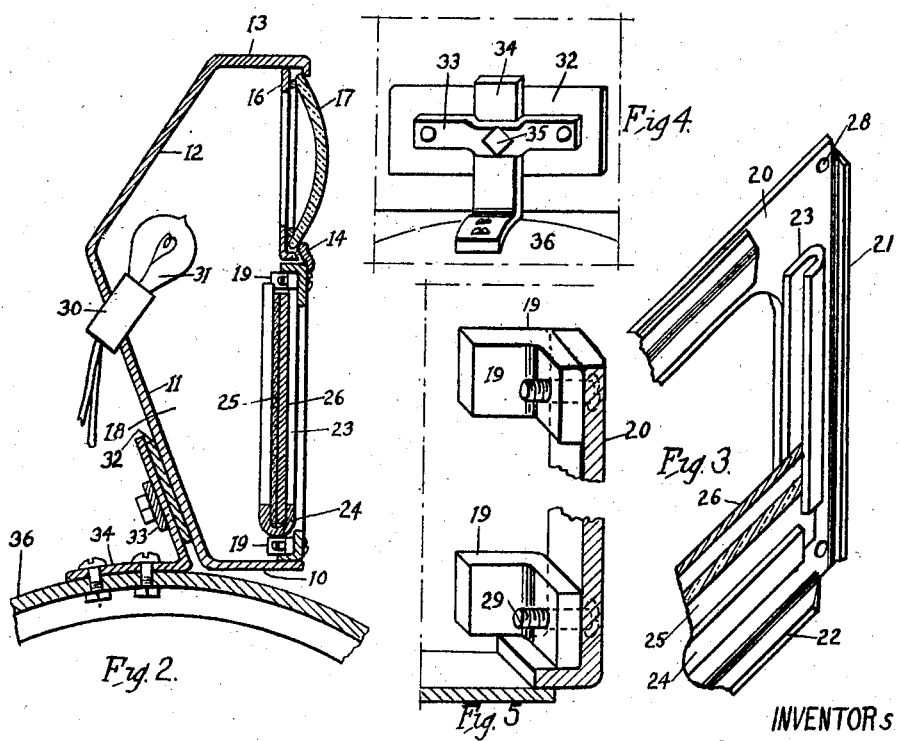
INVENTORS  
Ross L. Morlan  
Louis J. Costello  
BY  
ATTORNEYS
WITNESS  
L. F. Larsh Patented Dec. 23, 1924.

1,520,257

UNITED STATES PATENT OFFICE.

ROSS L. MORLAN AND LOUIS J. COSTELLO, OF DES MOINES, IOWA.

COMBINATION LICENSE-PLATE AND TAIL-LIGHT STRUCTURE.

Application filed February 27, 1924. Serial No. 695,428.

*To all whom it may concern:*

Be it known that we, Ross L. MORLAN and Louis J. COSTELLO, citizens of the United States, and residents of Des Moines, in the county of Polk and State of Iowa, have invented a certain new and useful Combination License-Plate and Tail-Light Structure, of which the following is a specification.

The object of our invention is to provide a combination license plate and tail light structure of simple, inexpensive, and durable construction.

A further object is to provide such a structure embodying a casing so arranged and constructed as to support a license plate and a transparent member and to support in addition an electric light bulb in such manner as to furnish a tail light and illumination for the license plate from the single bulb.

A further and more particular object is to provide such a device comprising a casing having a front wall provided with an opening to receive a license plate support and frame, the device being provided with suitable means for holding said frame in place.

A further object is to provide such a casing having in its upper portion a transparent member to remit the rays of the tail light.

A further and important object is to provide in such a device, a casing having a back member with a lower portion inclined upwardly and rearwardly from its bottom edge, and an upper portion inclined upwardly and forwardly from its bottom edge, and to mount in the lower portion a bulb adapted to throw light rays through the perforated number plate and through the transparent member.

With these and other objects in view, our invention consists in the construction, arrangement and combination of the various parts of our device, whereby the objects contemplated are attained, as hereinafter more fully set forth, pointed out in our claim, and illustrated in the accompanying drawings, in which:

Figure 1 shows an elevation of a license plate and tail light embodying our invention.

Figure 2 shows a vertical, sectional view taken on the line 2—2 of Figure 1.

Figure 3 shows a perspective view partly in section of the rear face of the license plate frame.

Figure 4 is a perspective view from the rear of the means for mounting the device on a motor vehicle; and Figure 5 is a perspective, sectional view taken on the line 5—5 of Figure 1.

In the accompanying drawings, we have shown a casing comprising the horizontal, lower wall or bottom indicated by the reference character 10.

Extending upwardly and rearwardly from the rear part of the bottom wall 10 is a rear wall 11. Extending upwardly and forwardly from the upper edge of the rear wall 11 is the rear wall portion 12.

At the top of the casing is a top member 13, which may have the general outline shown in Figure 1.

The upper portion of the casing has a front wall 14 in the central part of which is an opening 15 for the sight glass or lens forming part of the tail light structure.

Supported on the rear side of the front wall 14 is an annular frame or the like 16 between which and the wall 14 is mounted the lens 17. At the ends of the casing are the end walls 18.

Secured to the forward portions of the end walls 18 near the bottom thereof and adjacent to the lower edge of the front wall 14 are angles 19.

We provide a rectangular frame 20 having at its ends the rearwardly extending flanges 21, which terminate at their upper ends just short of the upper edge of the frame 20. At its lower edge, the frame 20 has a rearwardly extending flange 22 slightly shorter than the frame. Secured to the end members of the frame 20 are inwardly opening channels 23 and secured to the bottom member is an upwardly opening channel 24.

Received in the channels 23 and 24 is a rather heavy piece of frosted glass 25. The number plate 26 is stamped from a comparatively thin piece of sheet metal, so that it can be made very cheaply, of such size as to fit in the channels 23 and 24 in front of the glass 25. Indicating characters 27 are cut from the plate 26, so as to be open, as shown for instance in Figure 1.

In daylight the frosted glass shows clearly through the numbers and other indicating characters.

At the corners of the frame 20 are holes 28. After the frosted glass 25 and the license plate 26 have been inserted in position supported by the frame 20, the upper edge of the frame 20 is slipped under the lower edge of the front member 14 and the lower part of the frame 20 is then swung to position shown in Figure 2 with the flange 22 resting on the bottom member 10 and with the frame 20 standing adjacent to the flanges of the angles 19.

Screw bolts or the like 29 are extended through the holes 28 and screwed into the angles 19.

Mounted in the rear wall portion 11 and extending upwardly and forwardly, as shown in Figure 2, is a bulb socket 30 in which is mounted an electric light bulb 31.

It will be seen that the light bulb 31 will have its rays directly thrown through the transparent sight glass 17 and through the glass 25 and the openings 27 in the plate 26 and also that the rear wall members 11 and 12 serve to reflect light rays through the sight glass 17 and the openings in the number plate.

Thus a single bulb serves both for illuminating the number plate and as a tail light.

The frame 20 may be quickly and easily removed for substituting a new number plate 26. The number plate 26 because it is so firmly supported may be made of light gauge sheet metal at a very nominal expense.

The device may be readily used at the front of the car by omitting the sight glass 17.

Ordinarily for a tail light, the sight glass is tinted red. It may be used at the front of the car tinted green or without being tinted or may be omitted.

Secured to the rear wall member 11 is a plate or strap 32 having fastened thereto a yoke or the like 33 adapted to receive a post 34 held in place by a set screw 35 and mounted on the fender 36 or elsewhere on the motor vehicle.

The advantages of a device of this kind may be largely seen from the foregoing description.

The number plate is thoroughly illuminated at night. It can be seen at a considerable distance in the daytime, and for a farther distance when lighted up at night.

This device is of artistic appearance, uses only one bulb and will last as long as the car.

After having been once installed, the number plates for successive license years or periods can be made considerably cheaper than the number plates now used, because of the fact that thinner metal can be used for the number plates, and no ribs need be employed. One color of paint is all that is necessary for such number plates.

Some changes may be made in the details of the construction and arrangement of the parts of our improved device, without departing from the essential features and purposes of our invention, and it is our intention to cover by our claim, any modified forms of structure or use of mechanical equivalents, which may be reasonably included within its scope.

We claim as our invention:

In a license plate and tail light structure, a casing having rear, top, bottom and end walls and a front wall, a light device in the casing, a transparent member mounted in the upper part of the front wall, said front wall having an opening in its lower portion, a removable frame having on the inner side at its sides and lower part, channel-shaped guides and holders and having at its lower edge a flange, said frame being placed in said opening with said flange resting on the bottom wall of the casing and the upper edge of the frame overhung by the portion of the front wall above said opening, and a removable number plate received in said channels having open portions forming indicating characters, and a translucent member behind said plate.

Des Moines, Iowa, February 20, 1924.

ROSS L. MORLAN.
LOUIS J. COSTELLO.